US012732291B2

(12) United States Patent
Huang et al.

(10) Patent No.: US 12,732,291 B2
(45) Date of Patent: Sep. 8, 2026

(54) JOINT TRANSMISSION IN DISTRIBUTED MIMO SYSTEM

(71) Applicant: Samsung Electronics Co., Ltd., Suwon-si (KR)

(72) Inventors: Rui Huang, Vancouver (CA); R A Nadisanka Perera Rupasinghe, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 19/046,504

(22) Filed: Feb. 5, 2025

(65) Prior Publication Data

US 2025/0392401 A1 Dec. 25, 2025

Related U.S. Application Data

(60) Provisional application No. 63/663,544, filed on Jun. 24, 2024.

(51) Int. Cl.
*H04B 17/309* (2015.01)
*H04B 7/0456* (2017.01)
*H04L 5/00* (2006.01)

(52) U.S. Cl.
CPC ......... *H04B 17/346* (2023.05); *H04B 7/0456* (2013.01); *H04L 5/0055* (2013.01)

(58) Field of Classification Search
CPC .... H04B 17/346; H04B 7/0456; H04B 7/024; H04L 5/0055
See application file for complete search history.

(56) References Cited

U.S. PATENT DOCUMENTS

| | | | | |
|---|---|---|---|---|
| 9,154,194 | B2 * | 10/2015 | Koivisto | H04B 7/024 |
| 11,115,882 | B2 | 9/2021 | Wang et al. | |
| 11,818,062 | B2 | 11/2023 | Joseph et al. | |

(Continued)

FOREIGN PATENT DOCUMENTS

| | | | |
|---|---|---|---|
| CN | 112218379 | B | 3/2022 |
| WO | 2023028910 | A1 | 3/2023 |

(Continued)

OTHER PUBLICATIONS

International Search Report and Written Opinion issued Sep. 30, 2025 regarding International Application No. PCT/KR2025/008763, 6 pages.

(Continued)

*Primary Examiner* — Vineeta S Panwalkar

(57) ABSTRACT

Methods and apparatuses for a joint transmission in a distributed MIMO in wireless communication systems. The methods of BS comprise: identifying a type of UEs comprising a JT UE and a non-joint traffic non-JT UE; receiving, from the JT UE, feedback information for determining an SINR offset; identifying RBs for a C-JT, the RBs being designated for non-JT traffic and comprising at least one of a time domain resource or a frequency domain resource; determining whether to transmit the non-JT traffic on the RBs; determining the SINR offset for the non-JT UE based on a determination whether to transmit the non-JT traffic on the RBs; and performing an interference mitigation operation between JT UEs and non-JT UEs.

20 Claims, 8 Drawing Sheets

(56) References Cited

U.S. PATENT DOCUMENTS

| | | | | |
|---|---|---|---|---|
| 2023/0216634 | A1 * | 7/2023 | Tanaka | H04B 7/0456 370/329 |
| 2023/0276426 | A1 | 8/2023 | Chen et al. | |
| 2023/0388031 | A1 | 11/2023 | Zhang et al. | |
| 2024/0056154 | A1 | 2/2024 | Kim et al. | |
| 2024/0187055 | A1 | 6/2024 | Nguyen et al. | |

FOREIGN PATENT DOCUMENTS

| | | | |
|---|---|---|---|
| WO | 2023212008 | A1 | 11/2023 |
| WO | 2024026812 | A1 | 2/2024 |
| WO | 2024073970 | A1 | 4/2024 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 v16.4.0, Dec. 2020, 133 pgs.

"3rd Generation Partnership Project; Technical Specification Group Radio Access Network; NR; Multiplexing and channel coding (Release 16)", 3GPP TS 38.212 v16.4.0, Dec. 2020, 152 pgs.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

* cited by examiner

1100

START

IDENTIFY A TYPE OF UES — 1102

RECEIVE FEEDBACK INFORMATION — 1104

IDENTIFY RBS FOR C-JT — 1106

DETERMINE WHETHER TO TRANSMIT NON-JT TRAFFIC — 1108

DETERMINE SINR OFFSET FOR NON-JT UE — 1110

PERFORM INTERFERENCE MITIGATION — 1112

STOP

JOINT TRANSMISSION IN DISTRIBUTED MIMO SYSTEM

CROSS-REFERENCE TO RELATED APPLICATIONS AND CLAIM OF PRIORITY

The present application claims priority to U.S. Provisional Patent Application No. 63/663,544, filed on Jun. 24, 2024. The contents of the above-identified patent documents are incorporated herein by reference.

TECHNICAL FIELD

The present disclosure relates generally to wireless communication systems and, more specifically, the present disclosure relates to a joint transmission in a distributed multi-input multi-output system (MIMO) in wireless communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a joint transmission in a distributed MIMO in wireless communication systems.

In one embodiment, a base station (BS) in a wireless communication system is provided. The BS comprises a processor configured to identify a type of user equipments (UEs) comprising a joint traffic (JT) UE and a non-joint traffic (non-JT) UE. The BS further comprises a transceiver operably coupled to the processor, the transceiver configured to receive, from the JT UE, feedback information for determining a signal-to-interference noise ratio (SINR) offset. The processor of the BS is further configured to: identify resource blocks (RBs) for a coherent joint transmission (C-JT), the RBs being designated for non-JT traffic and comprising at least one of a time domain resource or a frequency domain resource, determine whether to transmit the non-JT traffic on the RBs, determine the SINR offset for the non-JT UE based on a determination whether to transmit the non-JT traffic on the RBs, and perform an interference mitigation operation between JT UEs and non-JT UEs.

In another embodiment, a method of a BS in a wireless communication system is provided. The method comprises: identifying a type of UEs comprising a JT UE and a non-JT UE; receiving, from the JT UE, feedback information for determining an SINR offset; identifying RBs for a C-JT, the RBs being designated for non-JT traffic and comprising at least one of a time domain resource or a frequency domain resource; determining whether to transmit the non-JT traffic on the RBs; determining the SINR offset for the non-JT UE based on a determination whether to transmit the non-JT traffic on the RBs; and performing an interference mitigation operation between JT UEs and non-JT UEs.

In yet another embodiment, a non-transitory computer-readable medium comprising program code is provided. The computer-readable medium, that when executed by at least one processor, causes an electronic device to: identify a type of UEs comprising a JT UE and a non-JT UE; receive, from the JT UE, an SINR offset; identify RBs for a C-JT, the RBs being designated for non-JT traffic and comprising at least one of a time domain resource or a frequency domain resource; determine whether to transmit the non-JT traffic on the RBs; determine the SINR offset for the non-JT UE based on a determination whether to transmit the non-JT traffic on the RBs; and perform an interference mitigation operation between JT UEs and non-JT UEs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system, or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
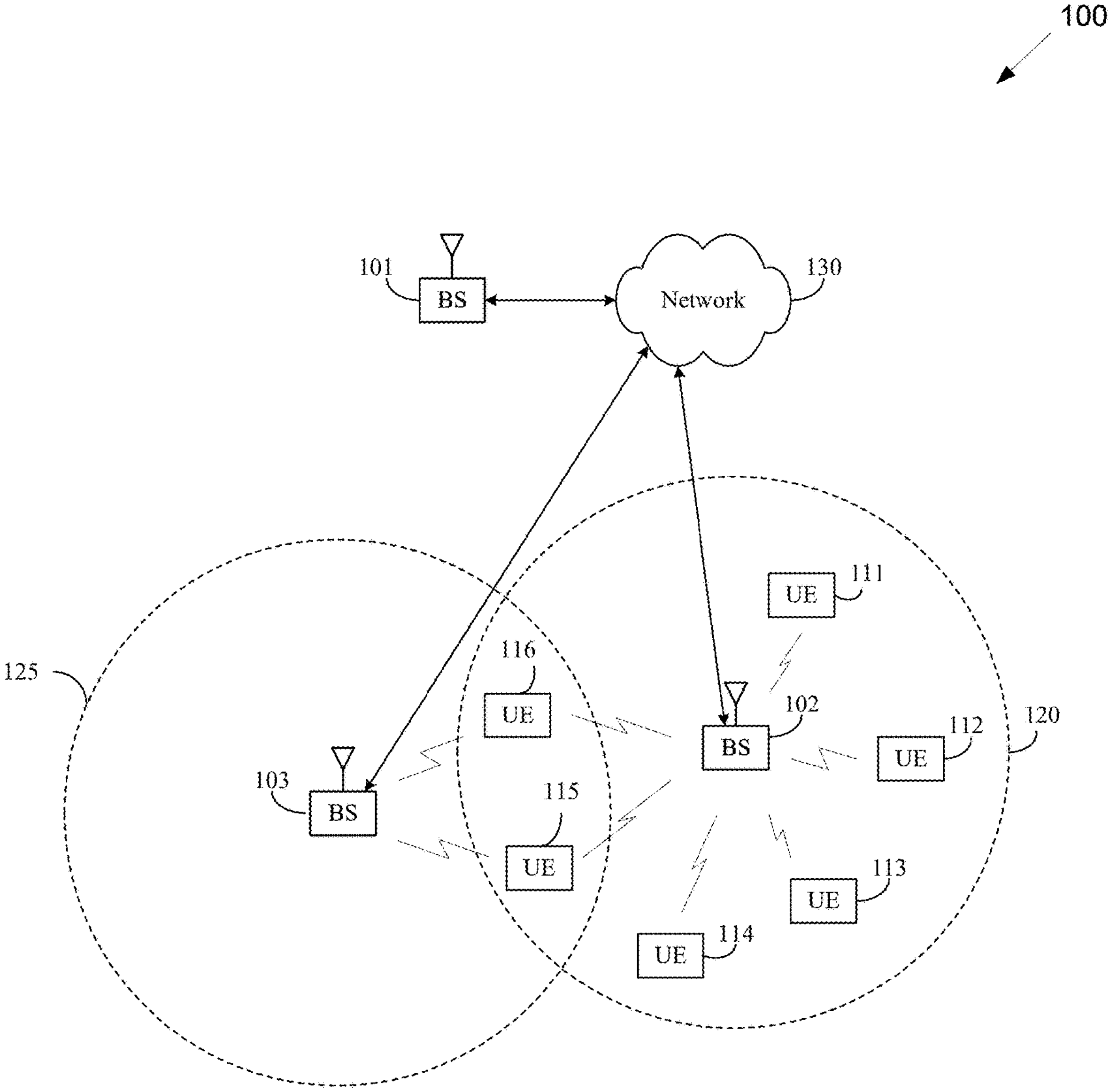
FIG. 1 illustrates an example of wireless network according to various embodiments of the present disclosure.

FIG. 1 through FIG. 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents are hereby incorporated by reference into the present disclosure as if fully set forth herein: 3GPP TS 36.211 v16.4.0, "E-UTRA, Physical channels and modulation"; 3GPP TS 36.212 v16.4.0, "E-UTRA, Multiplexing and Channel coding"; 3GPP TS 36.213 v16.4.0, "E-UTRA, Physical Layer Procedures"; 3GPP TS 36.321 v16.3.0, "E-UTRA, Medium Access Control (MAC) protocol specification"; 3GPP TS 36.331 v16.3.0, "E-UTRA, Radio Resource Control (RRC) Protocol Specification"; 3GPP TS 38.211 v16.4.0, "NR, Physical channels and modulation"; 3GPP TS 38.212 v16.4.0, "NR, Multiplexing and Channel coding"; 3GPP TS 38.213 v16.4.0, "NR, Physical Layer Procedures for Control"; 3GPP TS 38.214 v16.4.0, "NR, Physical Layer Procedures for Data"; 3GPP TS 38.215 v16.4.0, "NR, Physical Layer Measurements"; 3GPP TS 38.321 v16.3.0, "NR, Medium Access Control (MAC) protocol specification"; and 3GPP TS 38.331 v16.3.1, "NR, Radio Resource Control (RRC) Protocol Specification."

Figure 2:
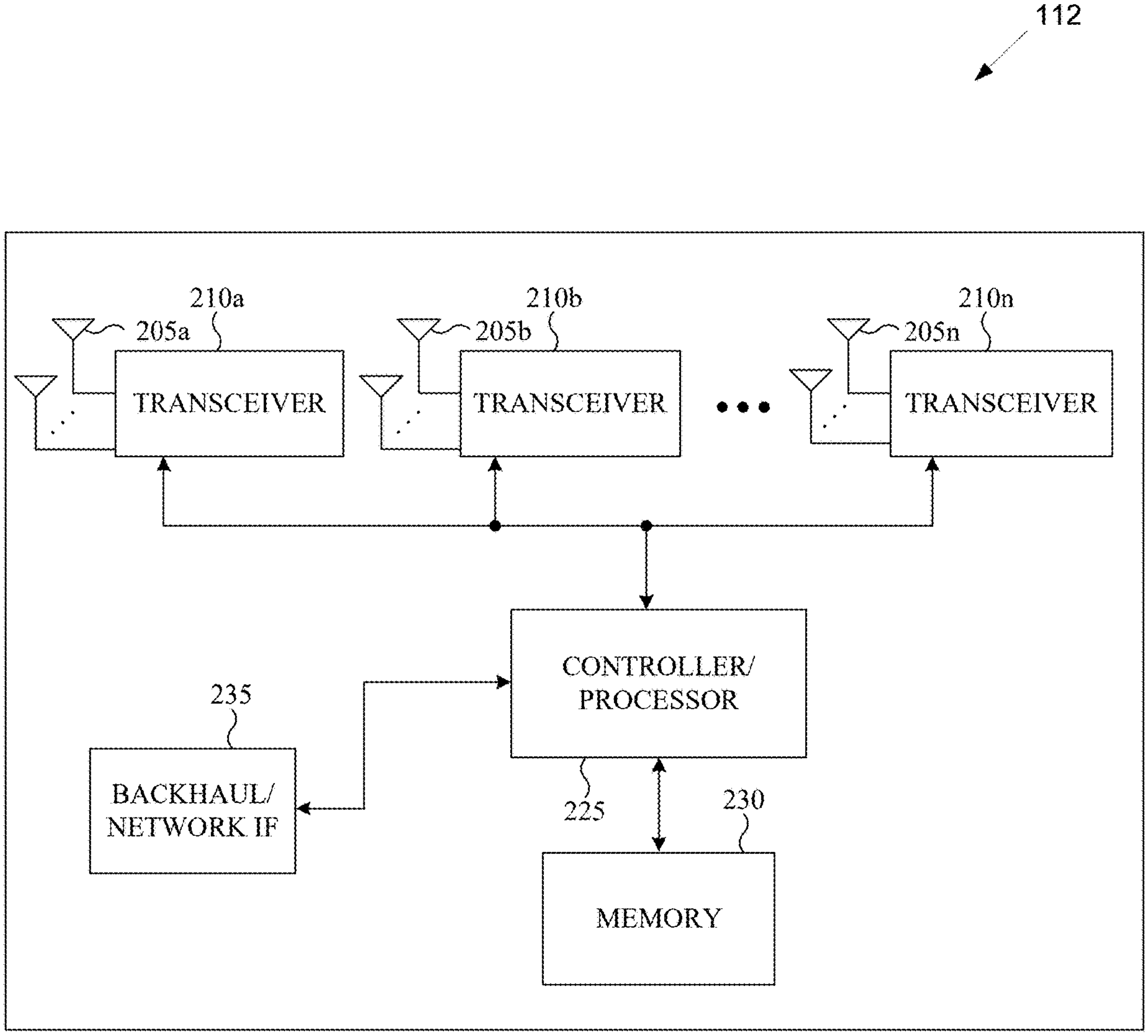
FIG. 2 illustrates an example of gNB according to various embodiments of the present disclosure.
Figure 3:
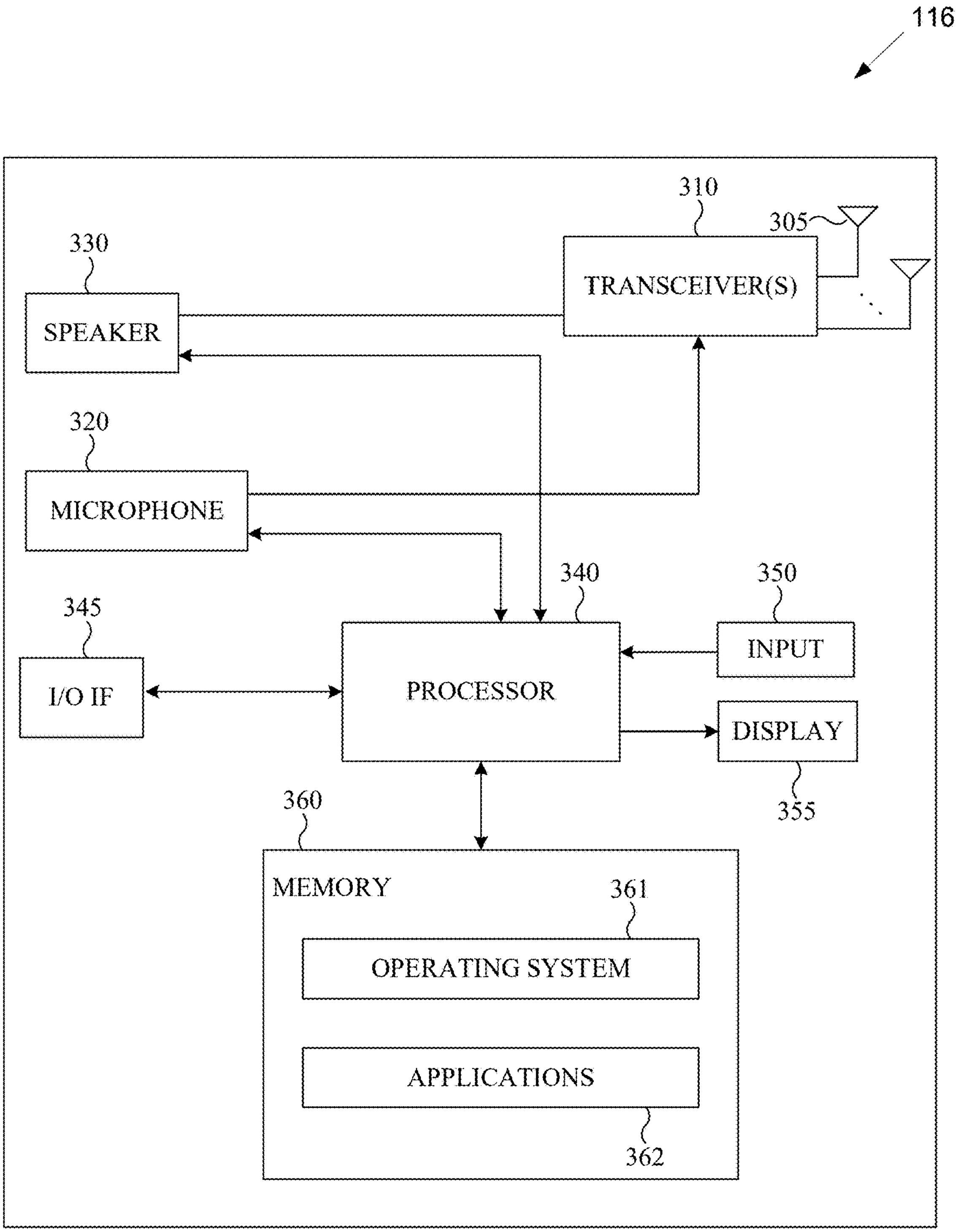
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to various embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, to generate signals and/or information supporting a joint transmission in a distributed MIMO, at a gNB 101-103, in wireless communication systems. In certain embodiments, and one or more of the gNBs 101-103 includes circuitry, programing, or a combination thereof, to support a joint transmission in a distributed MIMO in wireless communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to various embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support a joint transmission in a distributed MIMO in wireless communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a wireless communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to various embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes to generate signals and/or information for supporting a joint transmission in a distributed MIMO, at the gNB 101-103, in wireless communication systems.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
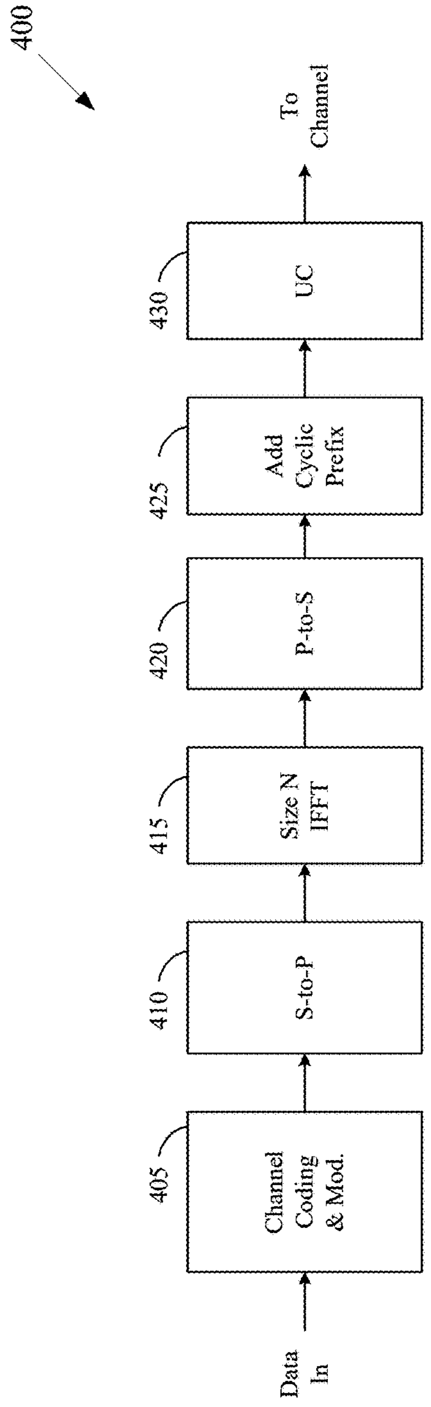
FIGS. 4 and 5 illustrate example of wireless transmit and receive paths according to various embodiments of the present disclosure.
Figure 5:
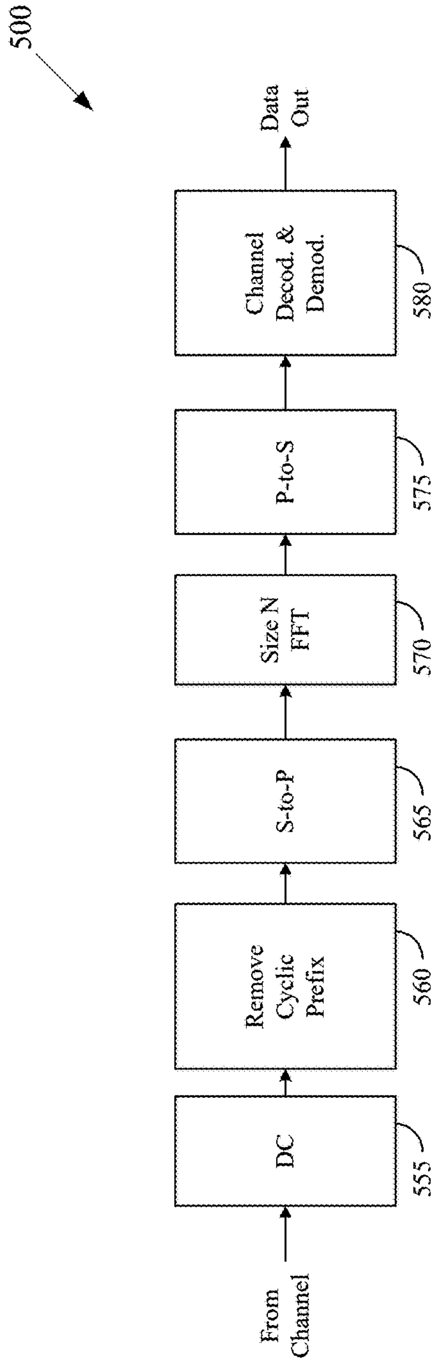

FIG. 4 and FIG. 5 illustrate example wireless transmit and receive paths according to various embodiments of the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as a radio resource control (RRC) signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
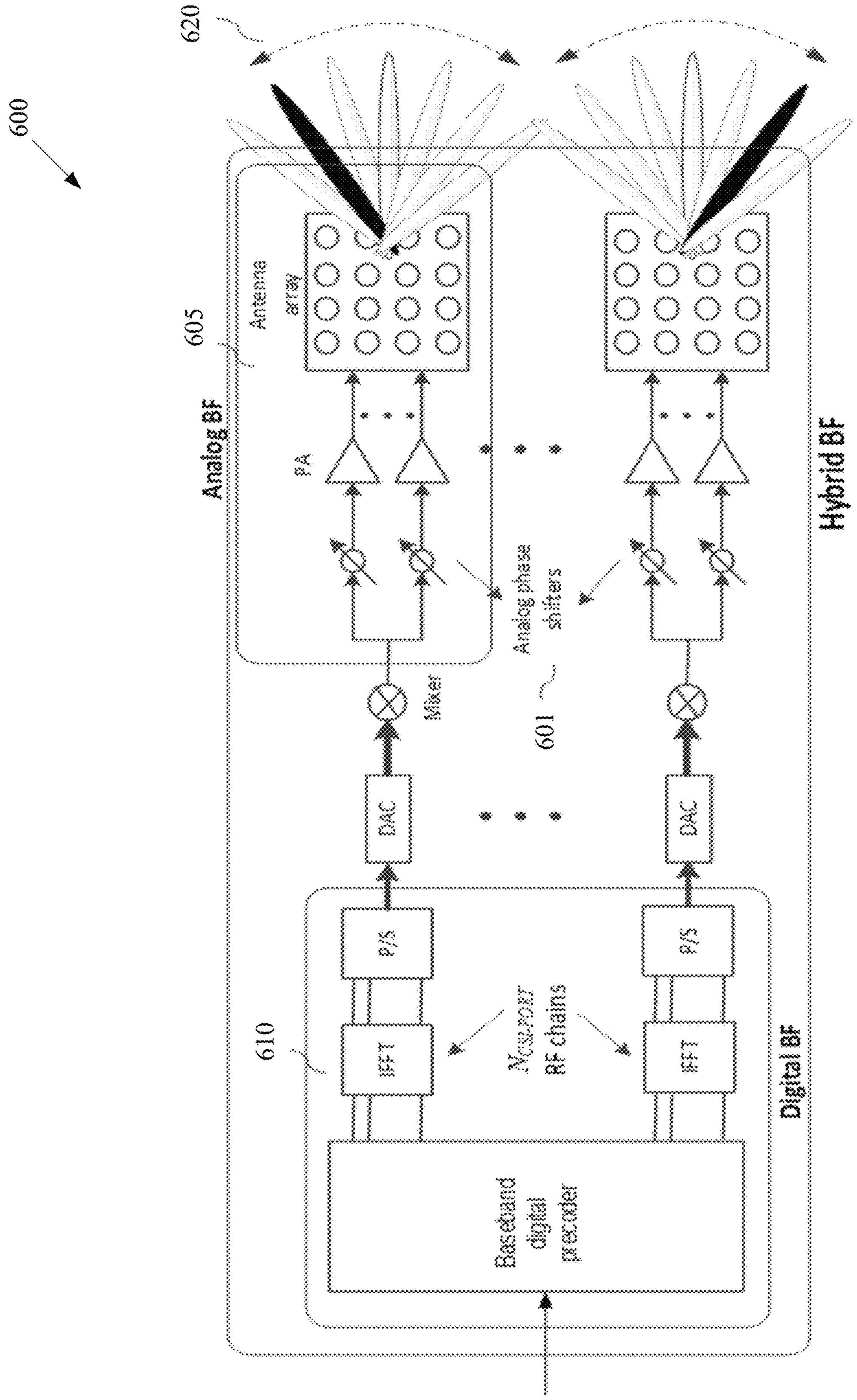
FIG. 6 illustrates an example of antenna structure according to various embodiments of the present disclosure.

FIG. 6 illustrates an example antenna structure 600 according to various embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

For a cellular system operating in a lower carrier frequency in general, a sub-1 GHz frequency range (e.g., less than 1 GHz) as an example, supporting large number of CSI-RS antenna ports (e.g., 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, a maximum number of CSI-RS antenna ports that can be co-located at a site (or RRH) or can be limited, for example to 8. This limits the spectral efficiency of such systems. In particular, the MU-MIMO spatial multiplexing gains offered due to a large number of CSI-RS antenna ports (such as 32) cannot be achieved due to the antenna form factor limitation.

One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location.

The present disclosure provides such a system (called distributed MIMO or multi-transmission-reception point (mTRP) or coherent joint transmission (CJT)) and provides methods to perform signal processing for the RF receive/transmit antenna network of multiple RRHs/panels in the system to support simultaneous transmission from multiple TRPs to multiple user equipments (UEs), where the provided methods can be realized based on precoding, multi-antenna processing, codebook, and feedback design for the purposes of interference cancellation and throughput enhancement.

In some embodiments, electronic devices and methods on precoding and beamforming methods for (distributed) MIMO operations are provided. More particularly, to electronic devices and methods for multiuser precoding, interference management, and throughput enhancement in (distributed) MIMO of wireless networks are provided in the present disclosure.

In a C-JT, multiple base stations simultaneously transmit signals to multiple joint transmission UEs to support their data communications. These users that are served by multiple base stations are referred to as the joint transmission (JT) UEs. However, some of the base stations that are participating in C-JT may need to serve other users as well when the data intended to other users arrive with high priorities. It may be referred to the users that are not a part of the JT as non-JT UEs.

Upon the mentioned traffic arrival of non-JT UE, the base stations that were previously supporting JT UEs may be required to transmit to the non-JT UEs instead. This leads to two problems that affect the experience of JT UEs. First, the target signal powers experienced at the JT UEs may be lower as some base stations need to allocate resources to transmit to non-JT UEs. Second, the transmissions to non-JT UEs may lead to higher interference level experienced at the JT UE. Due to these reasons, the JT UEs may experience lower signal-to-interference-plus-noise ratio (SINR), which may potentially lead to poor connections or even JT decoding failures.

To address such issues, the following two aspects may be considered. First, the transmission scheme for JT needs to be able to adapt to the potential arrival of non-JT traffic.

Specifically, the JT scheme may be able to accommodate the target signal power reduction of JT UEs when some of the participating base stations need to transmit to non-JT UEs. However, this is challenging as (1) the non-JT traffic arrival may be unpredictable, and (2) a base station may not be able to inform the remaining base stations about its non-JT traffic due to delay and signaling overhead concerns. Generally, a link adaptation (LA) mechanism has been designed to adjust the transmission scheme, e.g., a MCS and a rank, based on the quality of wireless channels. Using the existing LA mechanism, upon non-JT traffic, both MCS and rank of the JT transmission may be decreased dramatically to accommodate the loss in target signal power. However, the design of LA making it slow and inefficient to recover MCS and rank to its previous values, after the non-JT transmission has finished. The result is a long recovery time for the JT UEs to retain its previous performance (e.g., data rate, throughput) after the non-JT transmission. In practice, this makes the C-JT with the existing LA mechanism vulnerable to the potential impact of non-JT transmission, leading to lower throughput for JT UEs.

Second, the interference from the non-JT transmissions to the JT transmission need to be properly controlled. To do this, mechanisms need to be designed to limit the interference leakage from the non-JT transmission to the JT transmission. Generally, precoding designs based on CSI collected from explicit and/or implicit signaling are used to mitigate the interference. However, some existing precoding designs (e.g., zero-forcing precoder) may require a certain time duration for its computations to determine the precoders. Considering the high priority traffic of non-JT UEs, such traffic needs to be delivered within a short time window, making it impractical to use the aforementioned precoding designs that requires certain level of computations.

In the present disclosure, transmission and link adaptation methods are provided to support C-JT in distributed MIMO systems, taking the potential high-priority non-JT traffic arrival into account. Moreover, methods for mitigating the interference from non-JT UEs to JT UEs are provided, which can effectively reduce the interference level within a short time window and with a low computational complexity.

In the present disclosure, transmission and link adaptation methods are provided for the C-JT in distributed systems with potential high-priority non-JT traffic arrival at some of the base stations participating in C-JT. The mentioned methods comprises: (1) methods for multiple base stations in C-JT to align on which RBs to use for transmitting non-JT traffic, (2) methods for the participating base stations to adjust the JT transmission scheme to accommodate the potential non-JT traffic, including adjusting MCS and rank, while providing fast and efficient recovery for JT UEs after the transmission to non-JT UE finished, and (3) methods for mitigating the interference between non-JT UEs and JT UEs. This DOI also includes extensive performance evaluation results to demonstrate the effectiveness of the provided methods on supporting the non-JT traffic during C-JT in distributed MIMO systems, while minimizing the impact of non-JT traffic on the transmission to JT UEs.

In one embodiment, reserved resources for non-JT traffic are provided, aligning multiple base stations in C-JT on particular RBs to use for transmitting with non-JT traffic.

In one embodiment, LA enhancement for JT transmission is provided, adjusting, via one or more base stations, a JT transmission scheme to accommodate potential non-JT traffic, including adjusting MCS and rank, while providing recovery for JT UEs after completion of a transmission to a non-JT UE.

In one embodiment, fast and efficient interference mitigation is provided, mitigating interference between non-JT UEs and JT UEs without utilizing complex matrix operations including matrix inversion and singular value decomposition.

Although the focus of the present disclosure is on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

At lower frequency bands such as FR1 or particularly sub-1 GHz band, on the other hand, a number of antenna elements cannot be increased in a given form factor due to large wavelength if a critical distance (≥λ/2) between two adjacent antenna elements is maintained in deployment scenarios.

As an example, for the case of the wavelength size (λ) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a desired form factor. This can result in a limited number of physical antenna elements and, subsequently CSI-RS ports, that can be supported at a single site and limit the spectral efficiency of such systems.

Figure 7:
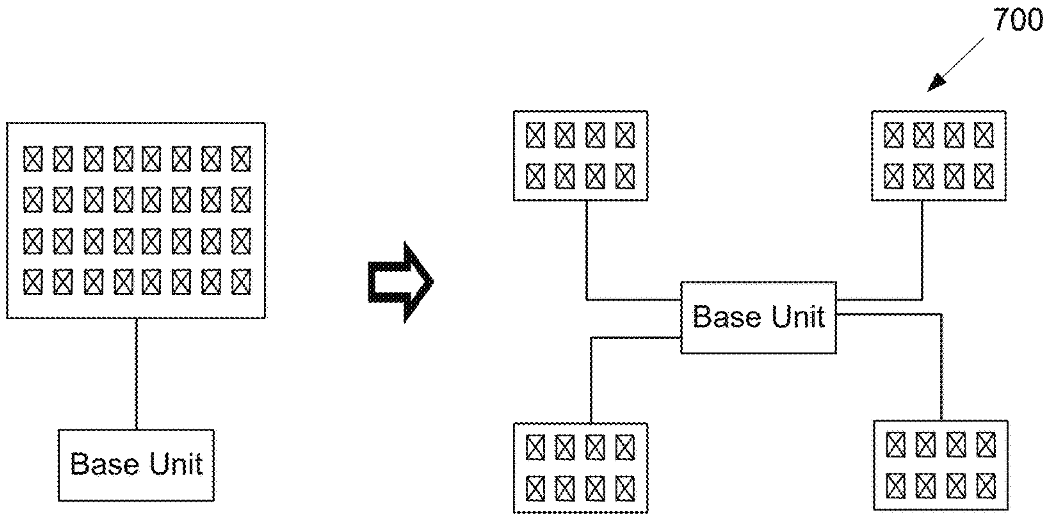
FIG. 7 illustrates an example of distributed MIMO according to various embodiments of the present disclosure.

One possible approach to resolve the issue is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 7.

FIG. 7 illustrates an example of distributed MIMO 700 according to various embodiments of the present disclosure. An embodiment of the distributed MIMO 700 shown in FIG. 7 is for illustration only.

Figure 8:
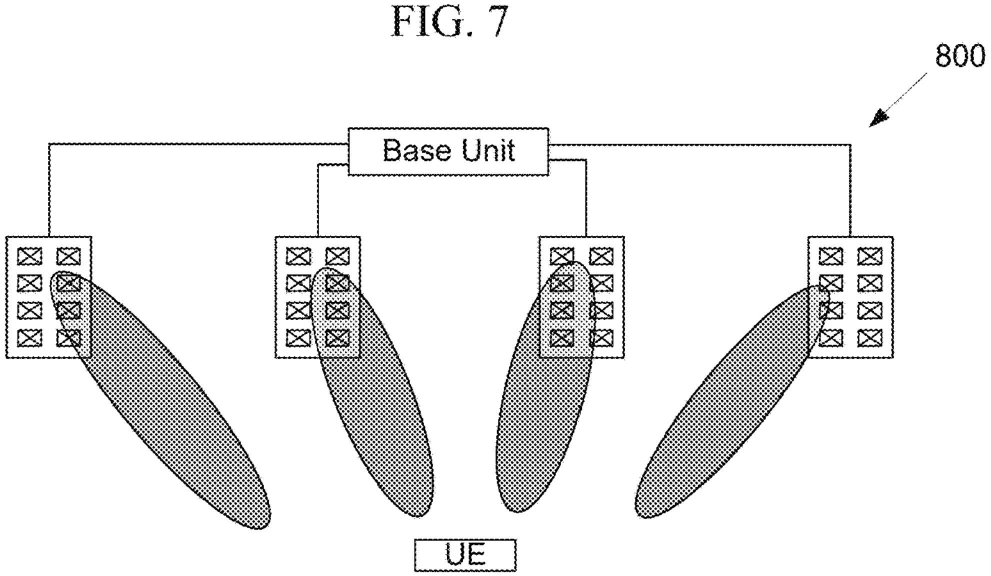
FIG. 8 illustrates another example of distributed MIMO according to various embodiments of the present disclosure.

The multiple antenna panels at multiple locations can still be connected to a single base unit, and thus the signal transmitted/received via multiple distributed panels can be processed in a centralized manner through the single base unit, as illustrated in FIG. 8. In another embodiment, it is possible that multiple distributed antenna panels are connected to more than one base units, which communicates with each other and jointly supporting single antenna system.

FIG. 8 illustrates another example of distributed MIMO 800 according to various embodiments of the present disclosure. An embodiment of the distributed MIMO 800 shown in FIG. 8 is for illustration only.

In TDD, one approach to acquire DL channel state information is to exploit UL channel estimation through receiving UL RSs (e.g., SRS) sent from UE. By using the channel reciprocity in TDD systems, the UL channel estimation itself can be used to infer DL channels. This favorable feature enables NW to reduce the training overhead significantly. However, due to the RF impairment at transmitter and receiver, directly using the UL channels for DL channels is not accurate and it requires a calibration process (periodically) among receive and transmit antenna ports of the RF network at NW.

In general, NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of NW and thus it can be done by NW's implementation in a confined manner (i.e., that does not interfere with other entities). However, it becomes difficult to perform the on-board calibration in distributed MIMO systems due to the distribution of the panels/RRHs over a wide region, and thus it may require over-the-air (OTA) signaling mechanisms to calibrate receive/transmit antenna ports among multiple RRHs/panels far away in distributed MIMO.

The present disclosure provides methods for distributed MIMO systems where different base stations and UEs are using different formats of explicit and implicit signaling to obtain CSI information. Explicit signaling may include reference signals that directly reflect the values of the entries in the channel matrix/vector, for example, SRS. Implicit signaling may indicate the properties of the CSI and the preferred precoders, instead of directly reflecting the values of the entries in the channel matrix/vector. Examples of implicit signaling may include a PMI. In the following, SRS are used as an example for explicit signaling, and PMI reports as an example for implicit signaling. However, the provided methods can also be applied to other explicit and implicit signaling, such as other reference signals including CSI-RS, SRS, and DMRS.

Although low-band TDD systems are exemplified for motivation purposes, the present disclosure can be applied to any frequency band in FR1 and/or FDD systems.

Following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, following components and embodiments are applicable for UL transmission when the scheduling unit in time is either one subframe (which can consist of one or multiple slots) or one slot.

The provided methods aim to support the non-JT traffic transmission during C-JT in distributed MIMO systems, while minimizing the impact of non-JT traffic on the transmission to JT UEs. In general, the non-JT traffic is considered to be in small volume, but with high priorities. Examples include the signals for control and synchronization purposes of non-JT UEs in the distributed MIMO systems.

Figure 9:
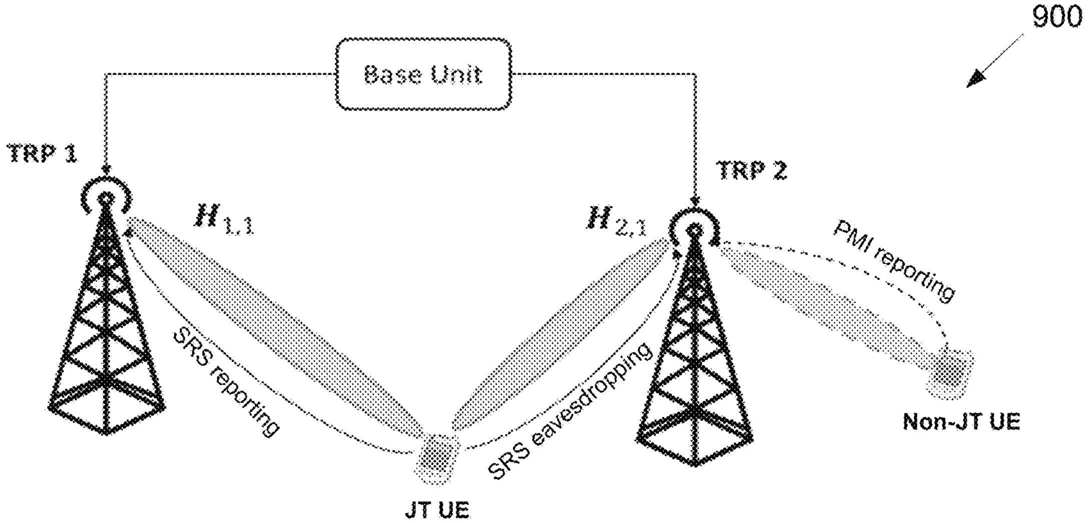
FIG. 9 illustrates an examples of C-JT in a distributed MIMO systems with non-JT traffic according to various embodiments of the present disclosure.

It may be referred to the users who are served by multiple base stations simultaneously as the joint transmission (JT) UEs. Further, it may refer to the users who are not a part of the JT as non-JT UEs. For the ease of presentation, following case is considered where one (1) JT UE and one (1) non-JT UE exist in the layout. JT UE is being served by two TRPs, namely TRP 1 and TRP2, while the non-JT UE is served by TRP 2 only, as illustrated in FIG. 9. Note that, the provided methods can be applied to scenarios with more than one UEs of each type, and one or more TRPs serving one or more UEs.

FIG. 9 illustrates an examples of C-JT in a distributed MIMO systems with non-JT traffic 900 according to various embodiments of the present disclosure. An embodiment of the C-JT in a distributed MIMO systems with non-JT traffic 900 shown in FIG. 9 is for illustration only.

For the JT UE, since SRS signals are available at both TRP 1 and TRP 2, the SRS-estimated channel between JT UE and TRP 1 and TRP 2 is denoted as $H_{1,1}$ and $H_{2,1}$, respectively. $W_{1,1}$, $W_{2,1}$ are denoted as the precoders for the JT UE at TRP 1 and TRP 2, respectively.

The provided methods for supporting non-JT traffic during C-JT in distributed MIMO are as follows.

In one embodiment, alignment between multiple base stations on reserved resources for non-JT Traffic is provided.

Before commencing C-JT towards JT UEs, it may be provided that certain amount of resources may be reserved for the purpose of non-JT traffic transmission. Moreover, the participating base stations may be aligned on and informed about the reserved resources for non-JT traffic transmission. The reserved resources can be configured in various domains and aspects.

In one example of such embodiment, a time domain resource reservation is provided.

In one embodiment, a time-domain resource reservation for non-JT traffic is considered. In particular, some transmission time intervals (TTIs) can be reserved for the participating base stations to transmit their non-JT traffic, if there are any. The factors for determining how many TTIs to reserve may include the estimation of non-JT traffic level, the estimation of JT traffic level, the potential number of non-JT UEs, and other related network parameters.

In one example, for the case where 5% of the downlink TTIs are reserved for non-JT traffic, t-th TTI (or TTI #t) can be configured to be a reserved TTI for non-JT traffic if it satisfies: mod(t, 40)=0 or mod(t, 40)=25 . . . (1). In equation (1), 2 TTIs are reserved for every 40 TTIs, leading to 5% of total downlink TTIs being reserved for non-JT traffic.

In one example, a frequency domain resource reservation is provided.

In another embodiment, frequency-domain resource reservation for non-JT traffic is considered. In particular, few resource blocks can be reserved by the participating base stations for JT to transmit their non-JT traffic, if there are any. Specifically, it may be provided to reserve part of the available bandwidth for non-JT traffic transmission. The factors for determining how many resource blocks to reserve may include the estimation of non-JT traffic level, the estimation of JT traffic level, the potential number of non-JT UEs, and other related network parameters. One or more resource blocks can be reserved for the non-JT traffic, based on the decisions of one or more base stations. Note that the participating base stations for C-JT need to be aligned on the reserved resources for non-JT traffic.

In one embodiment, the decision on reserved resources is made by one base station or one central processing unit (CPU), and then being informed to all participating base stations in the distributed MIMO systems. In another embodiment, the decision on reserved resources is made by achieving agreements and consensus between multiple base stations, based on the exchanges of signaling and other formats of information.

In one example, specific signaling can be used to indicate specific time and/or frequency resources that are reserved for non-JT traffic. Participating base stations can be informed through the exchanges of such signaling. In another example, a CPU may decide on the reserved resources and inform all the base stations via wired and/or wireless control channels.

In one embodiment, a link adaptation during JT transmission with non-JT traffic is provided. After the alignment on reserved resources as mentioned in the embodiments/examples, all participating base stations start to transmit to JT UEs. Subsequently, following methods can be considered for the base stations participating to C-JT to determine the MCS and rank, taking into account the reserved resources of non-JT traffic.

In the present disclosure, following examples, where time-domain resources, i.e., some particular TTIs, have been reserved for non-JT traffic, while the remaining TTIs are available for JT transmission. However, the mentioned methods can be applied to other formats of reserved resources as well.

In one embodiment, a dual-track outer-loop rate control (OLRC) method is provided to offset the existing OLRC utilized in the state-of-the-art LA process. In particular, with dual track OLRC, two separate OLRC tracks are used to adapt to the channel qualities of (1) C-JT without non-JT traffic, and (2) C-JT with non-JT traffic over reserved resources.

One of the OLRC tracks maintain a variable X to offset the SINR reported by the JT UE w.r.t the actual channel quality without non-JT traffic. To illustrate this point, the actual channel quality is determined by the actual SINR experienced during the JT transmission without non-JT traffic. This genie SINR is given:

$$\gamma_{1,JT} = \frac{|FH_{1,1}W_{1,1} + FH_{2,1}W_{2,1}|^2}{OCI + \|F\|_2^2\sigma^2}. \tag{2}$$

In equation (2), F denotes the combiner at the JT UE, e.g., MMSE combiner. And OCI denotes the interference coming from other cells. Let $\gamma_{1,rep}$ denotes as the SINR reported by the JT UE. The reported $\gamma_{1,rep}$ is in general inaccurate w.r.t., the genie SINR $\gamma_{1,JT}$ due to various reasons, including hardware impairments, channel variations, and other system design factors. To address this issue, the first OLRC track maintain a variable X to offset the reported SINR value, such that the offset SINR can approximate the genie SINR. That is: $\gamma_{1,rep}+X\rightarrow\gamma_{1,JT}$ . . . (3).

The value of X can be adjusted based on the ACK/NACK from the JT UE. Note that the purpose of the first track here is the same as the existing LA process for regular downlink transmission in the LTE/5G systems, therefore same process can be applied here.

Then, the other OLRC track here is specifically maintained to tackle the unique challenges in C-JT with non-JT traffic. It may be provided to use a separate OLRC track to maintain a new variable Y to offset the SINR reported by the JT UE w.r.t., the actual channel quality with non-JT traffic. Since some of the participating base stations now needs to transmit to non-JT UE, the genie SINR with non-JT traffic may be different from equation (3).

In the present disclosure, TRP 2 is considered to transmit to its non-JT, the genie SINR is given by:

$$\gamma_{1,Non\text{-}JT} = \frac{|FH_{1,1}W_{1,1}|^2}{|FH_{2,1}W_{Non\text{-}JT}|^2 + OCI + \|F\|_2^2\sigma^2}. \tag{4}$$

In equation (4), $W_{Non\text{-}JT}$ is the precoder of the non-JT UE served by TRP 2. It can be seen clearly that $\gamma_{1,Non\text{-}JT}$ in equation (4) is different from $\gamma_{1,JT}$ in equation (2), and $\gamma_{1,Non\text{-}JT}\leq\gamma_{1,JT}$. Due to such differences in the genie SINR between with non-JT traffic and without non-JT traffic, the OLRC variable X maintained in the first OLRC track (i.e., existing LA process) can no longer provide an accurate offset such that $\gamma_{1,rep}+X\rightarrow\gamma_{1,Non\text{-}JT}$.

To address such issue, it may be provided to use a separate OLRC track to maintain a new variable Y to offset the SINR reported by the JT UE w.r.t the actual channel quality with non-JT traffic, such that: $\gamma_{1,rep}+Y\rightarrow\gamma_{1,Non\text{-}JT}$ . . . (5).

In order to properly find the appropriate value of Y, in one embodiment, it may be provided to update Y based on the ACK/NACK of the transmission happened over the reserved resources with non-JT traffic. In one example, if the reserved resources are configured as equation (1), a buffer of size 40 can be maintained to track the values of Y on a TTI level, as shown in TABLE 1.

TABLE 1

Example of maintain the second track for the SINR offset value Y

| | mod(slot #, 40) = 0 | mod(slot #, 40) = 1 | . . . | mod(slot #, 40) = 25 | . . . . . . | mod(slot #, 40) = 39 |
|---|---|---|---|---|---|---|
| Values of Y | Y (0) | Y (1) | . . . | Y (25) | . . . . . . | Y (39) |

In this example, for the transmission of x-th TTI, the corresponding index in the table as t'=mod(t, 40) is first determined. Then, the current offset value Y can be obtained by looking up the table (or buffer), as Y(x'). Using a dual-track OLRC, the approximate SINR in C-JT with non-JT traffic in the x-th TTI is now given by $\gamma_{1,rep}(t)+Y(t')$. Then, the MCS and rank may be determined based on the approximated value $\gamma_{1,rep}(t)+Y(t')$.

After using Y(t') to determine the MCS and rank for JT transmission with non-JT traffic, the value of Y(t') may be updated based whether the transmission to the JT UE is successful. If an ACK is received (successful transmission), Y(t') may be increased by a predefined step size $\Delta Y_S$. That is: $Y(t')=Y(t')+\Delta Y_S$.

If a NACK is received (failed transmission), Y(t') may be decreased by a predefined step size $\Delta Y_F$. That is: $Y(t')=Y(t')+\Delta Y_F$.

After updating the value of Y(t'), the corresponding entry of Y(t') in the table (or buffer) may be updated.

In one embodiment, it can be observed that the OLRC offsets for the reserved resources discussed in the mentioned embodiments, i.e., Y(0), Y(25), may only be updated based on the previous transmission over the reserved resources. As an example, Y(0) may be updated in TTI #0, #40, #80, and so on. This makes sure that the value Y(0) can be maintained specifically for the transmission with non-JT traffic over the reserved resources.

In another embodiment, it may be provided to infer the offset value Y based on the correlation between the genie SINRs with and without non-JT traffic, that is, the correlation between $\gamma_{1,JT}$ and $\gamma_{1,Non\text{-}JT}$. Noticing from the equations (2) and (4) that, with the knowledge on the precoder of the non-JT UE $W_{Non\text{-}JT}$, the difference between the genie SINRs can be calculated as $$\Delta\gamma = \gamma_{1,JT} - \gamma_{1,Non\text{-}JT} = \frac{|FH_{1,1}W_{1,1} + FH_{2,1}W_{2,1}|^2}{OCI + \|F\|_2^2\sigma^2} - \frac{|FH_{1,1}W_{1,1}|^2}{|FH_{2,1}W_{Non\text{-}JT}|^2 + OCI + \|F\|_2^2\sigma^2}. \tag{6}$$

In this case, the value of Y from the value of X is inferred as: Y=X−Δγ . . . (7).

Note that, in order to calculate the different Δγ in equation (6), $W_{Non-JT}$ as well as the corresponding channel information between TRP 2 and JT UEs $H_{2,1}$ may need to be known by all base stations participating in C-JT.

In another embodiment, it may be provided to estimate the SINR difference Δγ at each participating base stations, based on the historical transmission recording, including the ACK/NACK from the JT UE regarding previous transmission. In one example, a deep neural network can be trained to learn a nonlinear function f(•) that map a particular value of X to a particular value of Δγ and therefore Y.

In one embodiment, using supervised learning, a deep neural network can be trained to predict the differences Δγ, using the mean squared error between the true value and the predict values of Δγ. In another example, using reinforcement learning, a deep neural network can be trained to adjust the value of Δγ, such that the resulting Y can lead to the best performance, e.g., the best downlink transmission rate for JT UE over reserved resources with non-JT traffic.

In one embodiment, a fast and efficient interference mitigating of non-JT UEs toward JT UEs is provided.

For the non-JT traffic transmission over the reserved resources, the interference toward JT UE needs to be properly controlled, such that the SINR degradation due to non-JT traffic, i.e., Δγ in equation (6), can be relatively small. This requires the interference power $|FH_{2,1}W_{Non-JT}|^2$ to be relatively small. One unique challenge for the high-priority non-JT traffic is that the transmission may be accomplished within a short time window, making it important to design simple, fast, yet efficient solutions to control interference power.

To achieve this, it may be provided to determine and modified the precoder of non-JT UE $W_{Non-JT}$ based on which type of signaling is utilized to obtain channel state information. In particular, in another embodiment methods for distributed MIMO systems where different base stations and UEs are using different formats of explicit and implicit signaling to obtain CSI information is provided. Explicit signaling may include reference signals that directly reflect the values of the entries in the channel matrix/vector, for example, SRS.

An implicit signaling may indicate the properties of the CSI and the preferred precoders, instead of directly reflecting the values of the entries in the channel matrix/vector. Examples of implicit signaling may include a PMI. In following, SRS is used as an example for explicit signaling, and PMI reports as an example for implicit signaling. However, the provided methods can also be applied to other explicit and implicit signaling, such as other reference signals including CSI-RS, SRS, and DMRS.

In one example, power de-boosting is provided.

In one embodiment, regardless of whether implicit or explicit signaling is utilized, transmit power of the original precoder derived based on the implicit or explicit signaling $W_{Non-JT,ori}$ is reduced by a predefined factor β≤1. That is, $W_{Non-JT}$ is derived as:

$$W_{Non-JT} = \sqrt{\beta}\, W_{Non-JT,ori}. \tag{8}$$

In one example, an implicit signaling-based precoder determination is provided.

In this example, it may be provided to modify the original precoder determined from the implicit signaling $W_{Non-JT,ori}$ by finding a new precoder in a predefined codebook by solving the following problem:

$$\max_{W} \left\| W_{Non-JT,ORI}^{H} W \right\|_2^2 \ s.t.\ |FH_{2,1}W|^2 \le P^{max}. \tag{9}$$

In equation (9), $P^{max}$ denote the maximum tolerable interference leakage toward JT UE. Equation (9) can be solved by doing a quick search over the predefined codebook, e.g., Type I codebook or C-JT codebook.

After obtaining the precoder $W_{Non-JT}$, now the base stations with non-JT traffic may transmit to the non-JT UEs with $W_{Non-JT}$ using the reserved resources. Meanwhile, remaining base station may proceed with transmission to JT UEs, using the MCS and rank determined by the provided dual-track OLRC method as explained in the mentioned embodiments/examples of the present disclosure.

Figure 10:
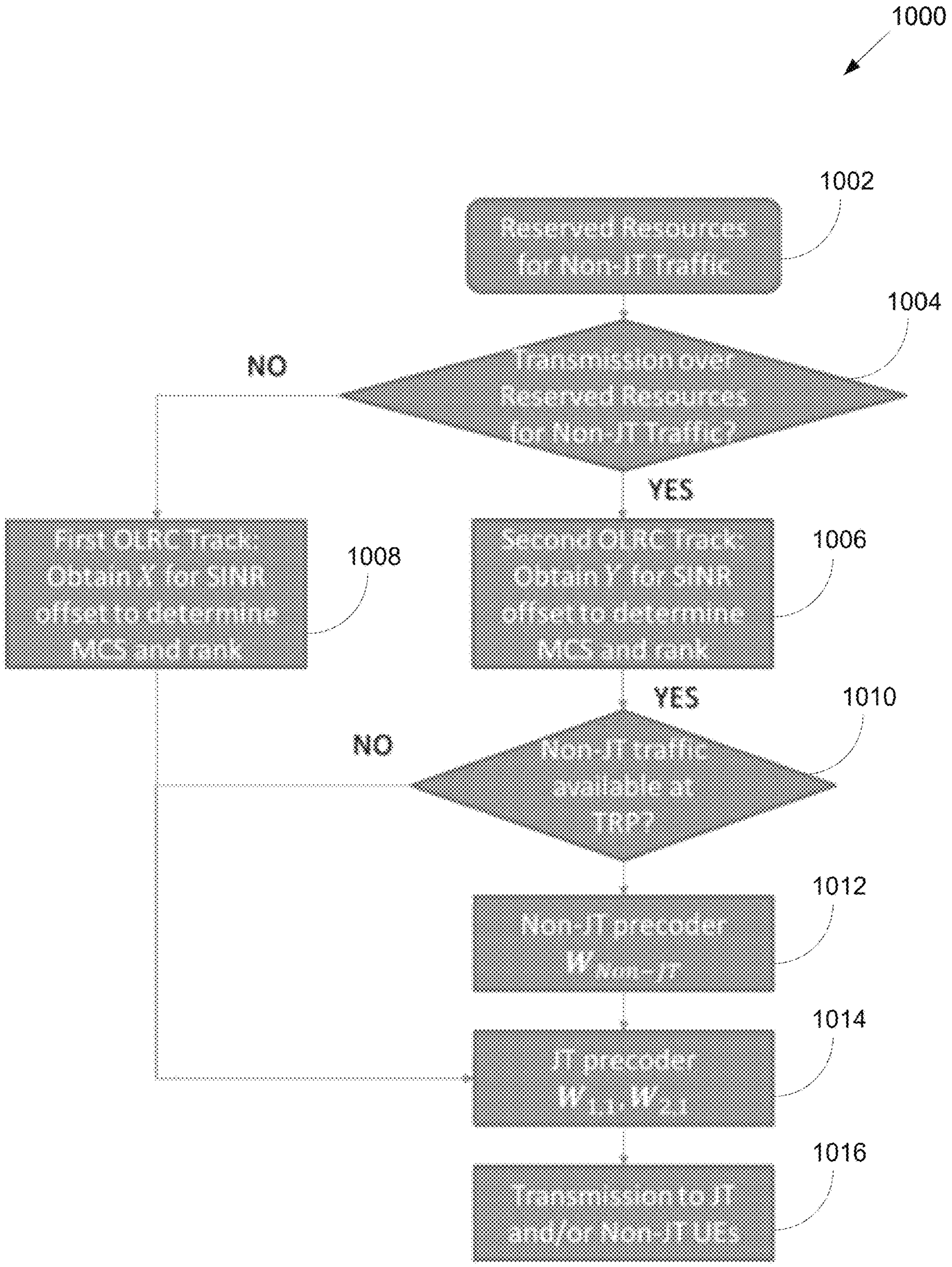
FIG. 10 illustrates a flowchart of BS method for a joint transmission according to various embodiments of the present disclosure.

FIG. 10 illustrates a flowchart of BS method 1000 for a joint transmission according to various embodiments of the present disclosure. The BS method 1000 as may be performed by a BS (e.g., 101-103 as illustrated in FIG. 1). An embodiment of the BS method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, the method 1000 begins at step 1002. In step 1002, the BS reserves resources for non-JT traffic. Subsequently, in step 1004, the BS determines whether to perform a transmission over the reserved resources for the non-JT traffic. In step 1006, the BS obtains Y for SINR offset to determine MCS and rank for a second OLRC track when the transmission is performed. In step 1008, the BS obtains X for SINR offset to determine MCS and rank for a second OLRC track when the transmission is not performed. In step 1010, the BS determines whether the non-JT traffic is available at TRP. In step 1010, if it is available, the BS performs in step 1012 non-JT precoding $W_{NON-JT}$. In step 1010, if it is not available, the BS performs step 1008. In step 1014, the BS enables the JT precoder $W_{1,1}$, $W_{2,1}$. Finally, the BS in step 1016 performs a transmission to JT and/or non-JT UEs.

Figure 11:
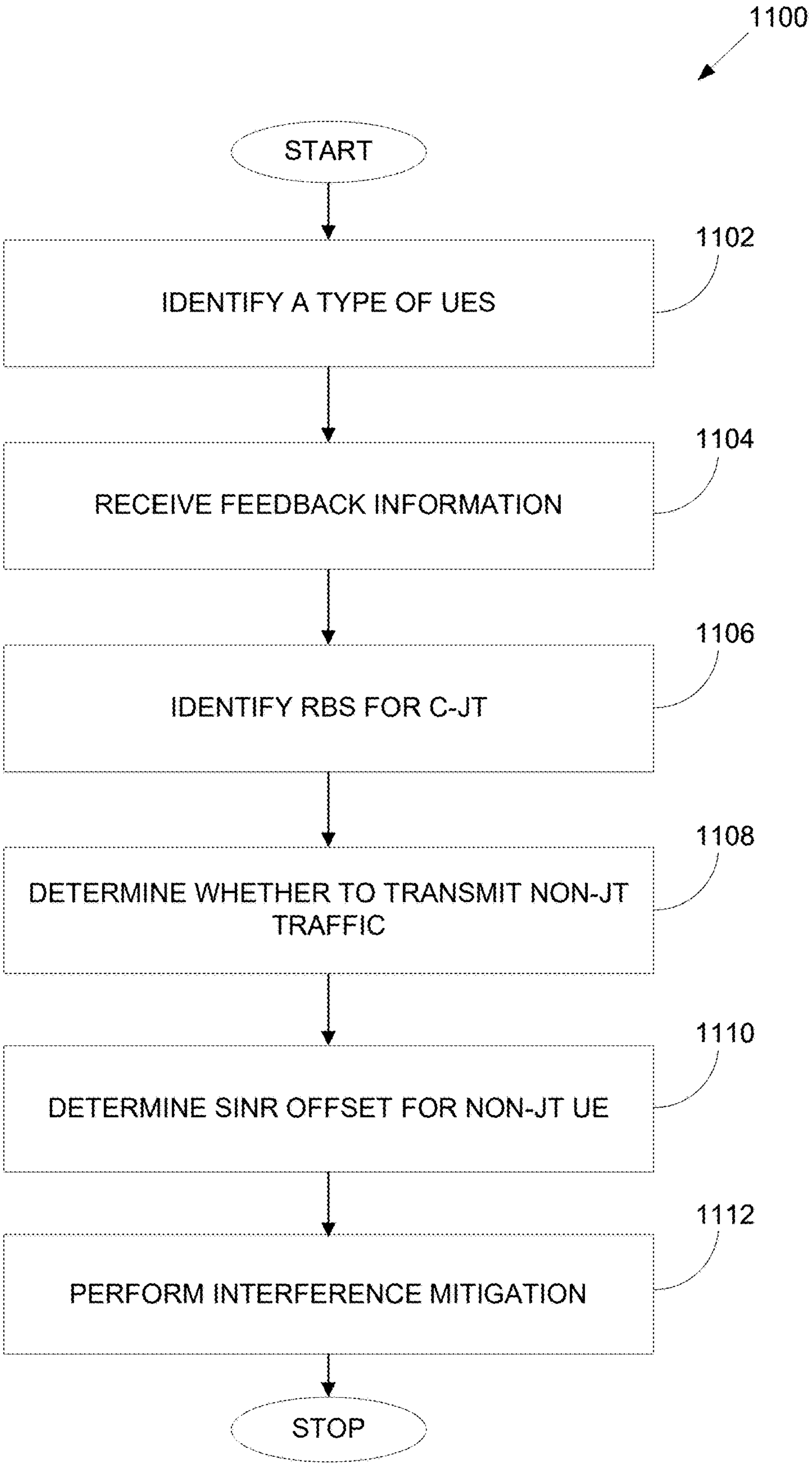
FIG. 11 illustrates a flowchart of BS method for a joint transmission in a distributed MIMO according to various embodiments of the present disclosure.

FIG. 11 illustrates a flowchart of BS method 1100 for a joint transmission in a distributed MIMO according to various embodiments of the present disclosure. The BS method 1100 as may be performed by a BS (e.g., 101-103 as illustrated in FIG. 1). An embodiment of the BS method 1100 shown in FIG. 11 is for illustration only. One or more of the components illustrated in FIG. 21 can be implemented in specialized circuitry configured to perform the noted functions or one or more of the components can be implemented by one or more processors executing instructions to perform the noted functions.

AS illustrated in FIG. 11, the method 1100 begins at step 1102. In step 1102, a BS identifies a type of UEs comprising a JT UE and a non-JT UE.

In one embodiment, the BS belongs to a set of BSs performing a multi-TRP transmission and the set of BSs performing the multi-TRP transmission communicates each other for performing the C-JT.

Subsequently, in step 1104, the BS receives, from the JT UE, feedback information for determining an SINR offset.

Subsequently, in step 1106, the BS identifies RBs for a C-JT. In this step, the RBs is designated for non-JT traffic and comprising at least one of a time domain resource or a frequency domain resource.

Subsequently, in step 1108, the BS determines whether to transmit the non-JT traffic on the RBs.

Next, in step 1110, the BS determines the SINR offset for the non-JT UE based on a determination whether to transmit the non-JT traffic on the RBs.

Finally, in step 1112, the BS performs an interference mitigation operation between JT UEs and non-JT UEs.

In one embodiment, a BS identifies a variable X as the value based on a determination that a transmission of the non-JT traffic is unavailable on the RBs, or identify a variable Y as the value based on a determination that the transmission of the non-JT traffic is available on the RBs designated for the non-JT traffic. In such embodiments, the value for the SINR offset comprises the variable X and the variable Y. In such embodiments, the value for the SINR offset is identified to determine a modulation and coding scheme (MCS) and a rank for the JT-UEs and the non-JT UEs.

In such embodiments, the variable X is used for a first dual-track-OLRC operation configured to adapt channel quality of the C-JT without the non-JT traffic and the variable Y is used for a second OLRC operation configured to adapt the channel quality of the C-JT with the non-JT traffic on the RBs.

In one embodiment, a BS receives, from the non-JT UE, ACK/NACK information associated with the non-JT traffic transmitted on the RBs and updates the variable Y based on the ACK/NACK information.

In one embodiment, a BS determines whether to transmit the non-JT traffic, identify (i) a non-JT precoder based on a determination that the non-JT traffic is transmitted and (ii) a JT precoder based on a determination that the non-JT traffic is not transmitted, and transmits, based on the non-JT precoder, the non-JT traffic to the non-JT UEs; and transmits, based on the JT precoder, the JT traffic to the JT UEs.

In one embodiment, a BS performs, based on a predefined power de-boosting factor, a power de-boosting operation associated with the non-JT traffic for the interference mitigation operation or identifies, based on a precoder, a precoding matrix indicator (PMI) for the interference mitigation operation, the precoder being identified based on a predefined codebook.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:

a processor configured to identify a type of user equipments (UEs) comprising a joint traffic (JT) UE and a non-joint traffic (non-JT) UE; and a transceiver operably coupled to the processor, the transceiver configured to receive, from the JT UE, feedback information for determining a signal-to-interference noise ratio (SINR) offset, wherein the processor is further configured to:

identify resource blocks (RBs) for a coherent joint transmission (C-JT), the RBs being designated for non-JT traffic and comprising at least one of a time domain resource or a frequency domain resource, determine whether to transmit the non-JT traffic on the RBs, determine the SINR offset for the non-JT UE based on a determination whether to transmit the non-JT traffic on the RBs, and perform an interference mitigation operation between JT UEs and non-JT UEs.

2. The BS of claim 1, wherein:

a value for the SINR offset comprises a variable X and a variable Y; and the processor is further configured to:

identify the variable X as the value based on a determination that a transmission of the non-JT traffic is unavailable on the RBs, or identify the variable Y as the value based on a determination that the transmission of the non-JT traffic is available on the RBs designated for the non-JT traffic.

3. The BS of claim 2, wherein:

the variable X is used for a first dual-track-outer-loop rate control (OLRC) operation configured to adapt channel quality of the C-JT without the non-JT traffic; and the variable Y is used for a second OLRC operation configured to adapt the channel quality of the C-JT with the non-JT traffic on the RBs.

4. The BS of claim 3, wherein:

the transceiver is further configured to receive, from the non-JT UE, acknowledgement/non-acknowledgement (ACK/NACK) information associated with the non-JT traffic transmitted on the RBs; and the processor is further configured to update the variable Y based on the ACK/NACK information.

5. The BS of claim 1, wherein a value for the SINR offset is identified to determine a modulation and coding scheme (MCS) and a rank for the JT-UEs and the non-JT UEs.

6. The BS of claim 1, wherein:

the processor is further configured to:

determine whether to transmit the non-JT traffic, and identify (i) a non-JT precoder based on a determination that the non-JT traffic is transmitted and (ii) a JT precoder based on a determination that the non-JT traffic is not transmitted; and the transceiver is further configured to:

transmit, based on the non-JT precoder, the non-JT traffic to the non-JT UEs, and transmit, based on the JT precoder, the JT traffic to the JT UEs.

7. The BS of claim 1, wherein the processor is further configured to:

perform, based on a predefined power de-boosting factor, a power de-boosting operation associated with the non-JT traffic for the interference mitigation operation; or identify, based on a precoder, a precoding matrix indicator (PMI) for the interference mitigation operation, the precoder being identified based on a predefined codebook.

8. The BS of claim 1, wherein:

the BS belongs to a set of BSs performing a multi-transmission-reception point (TRP) transmission; and the set of BSs performing the multi-TRP transmission communicates each other for performing the C-JT.

9. A method of a base station (BS) in a wireless communication system, the method comprising:

identifying a type of user equipments (UEs) comprising a joint traffic (JT) UE and a non-joint traffic (non-JT) UE;

receiving, from the JT UE, feedback information for determining a signal-to-interference noise ratio (SINR) offset;

identifying resource blocks (RBs) for a coherent joint transmission (C-JT), the RBs being designated for non-JT traffic and comprising at least one of a time domain resource or a frequency domain resource;

determining whether to transmit the non-JT traffic on the RBs;

determining the SINR offset for the non-JT UE based on a determination whether to transmit the non-JT traffic on the RBs; and performing an interference mitigation operation between JT UEs and non-JT UEs.

10. The method of claim 9, further comprising:

identifying a variable X as a value based on a determination that a transmission of the non-JT traffic is unavailable on the RBs; or identifying a variable Y as the value based on a determination that the transmission of the non-JT traffic is available on the RBs designated for the non-JT traffic, wherein the value for the SINR offset comprises the variable X and the variable Y.

11. The method of claim 10, wherein:

the variable X is used for a first dual-track-outer-loop rate control (OLRC) operation configured to adapt channel quality of the C-JT without the non-JT traffic; and the variable Y is used for a second OLRC operation configured to adapt the channel quality of the C-JT with the non-JT traffic on the RBs.

12. The method of claim 11, further comprising:

receiving, from the non-JT UE, acknowledgement/non-acknowledgement (ACK/NACK) information associated with the non-JT traffic transmitted on the RBs; and updating the variable Y based on the ACK/NACK information.

13. The method of claim 9, wherein a value for the SINR offset is identified to determine a modulation and coding scheme (MCS) and a rank for the JT-UEs and the non-JT UEs.

14. The method of claim 9, further comprising:

determining whether to transmit the non-JT traffic;

identifying (i) a non-JT precoder based on a determination that the non-JT traffic is transmitted and (ii) a JT precoder based on a determination that the non-JT traffic is not transmitted;

transmitting, based on the non-JT precoder, the non-JT traffic to the non-JT UEs; and transmitting, based on the JT precoder, the JT traffic to the JT UEs.

15. The method of claim 9, further comprising:

performing, based on a predefined power de-boosting factor, a power de-boosting operation associated with the non-JT traffic for the interference mitigation operation; or identifying, based on a precoder, a precoding matrix indicator (PMI) for the interference mitigation operation, the precoder being identified based on a predefined codebook.

16. The method of claim 9, wherein:

the BS belongs to a set of BSs performing a multi-transmission-reception point (TRP) transmission; and the set of BSs performing the multi-TRP transmission communicates each other for performing the C-JT.

17. A non-transitory computer-readable medium comprising program code, that when executed by at least one processor, causes an electronic device to:

identify a type of user equipments (UEs) comprising a joint traffic (JT) UE and a non-joint traffic (non-JT) UE;

receive, from the JT UE, feedback information for determining a signal-to-interference noise ratio (SINR) offset;

identify resource blocks (RBs) for a coherent joint transmission (C-JT), the RBs being designated for non-JT traffic and comprising at least one of a time domain resource or a frequency domain resource;

determine whether to transmit the non-JT traffic on the RBs;

determine the SINR offset for the non-JT UE based on a determination whether to transmit the non-JT traffic on the RBs; and perform an interference mitigation operation between JT UEs and non-JT UEs.

18. The computer-readable medium of claim 17, further comprising program code, that when executed by the at least one processor, causes the electronic device to:

identify a variable X as a value based on a determination that a transmission of the non-JT traffic is unavailable on the RBs, or identify a variable Y as the value based on a determination that the transmission of the non-JT traffic is available on the RBs designated for the non-JT traffic, wherein the value for the SINR offset comprises the variable X and the variable Y.

19. The computer-readable medium of claim 18, wherein:

the variable X is used for a first dual-track-outer-loop rate control (OLRC) operation configured to adapt channel quality of the C-JT without the non-JT traffic; and the variable Y is used for a second OLRC operation configured to adapt the channel quality of the C-JT with the non-JT traffic on the RBs.

20. The computer-readable medium of claim 19, further comprising program code, that when executed by the at least one processor, causes the electronic device to:

receive, from the non-JT UE, acknowledgement/non-acknowledgement (ACK/NACK) information associated with the non-JT traffic transmitted on the RBs; and update the variable Y based on the ACK/NACK information.

* * * * *